United States Patent [19]

Keck et al.

[11] Patent Number: 5,068,161
[45] Date of Patent: Nov. 26, 1991

[54] CATALYST MATERIAL

[75] Inventors: Lindsey Keck, Boyertown, Pa.; Jeffrey Buchanan, Eastleigh; Graham A. Hards, Wallingford, both of England

[73] Assignee: Johnson Matthey Public Limited Company, London, England

[21] Appl. No.: 501,947

[22] Filed: Mar. 30, 1990

[51] Int. Cl.$^5$ ............................................. H01M 4/88
[52] U.S. Cl. ..................................... 429/44; 502/101; 502/185
[58] Field of Search ............... 502/185, 326, 339, 101; 429/44

[56] References Cited

U.S. PATENT DOCUMENTS

| | | | |
|---|---|---|---|
| 3,354,060 | 11/1967 | Carl | 429/27 X |
| 3,468,717 | 9/1969 | Waters et al. | 429/27 |
| 4,186,110 | 1/1980 | Jalan et al. | 429/44 X |
| 4,316,944 | 2/1982 | Landsman et al. | 502/101 X |
| 4,447,506 | 5/1984 | Luczak et al. | 502/313 X |
| 4,513,094 | 4/1985 | Luczak | 502/101 |
| 4,954,474 | 9/1990 | Tsurumi et al. | 502/185 |

Primary Examiner—Stephen J. Kalafut
Attorney, Agent, or Firm—Cushman, Darby & Cushman

[57] ABSTRACT

An electrocatalytic material comprises an alloy of platinum with another element, supported on a conductive carbon support, the platinum loading being at 20 to 60 wt % and the ECA of the alloy being greater than 35 m$^2$/g, is especially suitable for use in phosphoric acid fuel cells, and demonstrates unexpectedly high performance with high Pt loadings.

22 Claims, No Drawings

CATALYST MATERIAL

This invention concerns an improved catalyst material, more especially it concerns a catalyst material of particular interest for fuel cells, containing a platinum alloy.

In the art of fuel cells, there have been very many proposals for the production of electrocatalysts which are used to coat one or both of the electrodes. It is useful to recall that in a fuel cell, a fuel, which may be hydrogen, a hydrocarbon or an oxygen-containing fuel such as methanol, is oxidised at a fuel electrode (anode) and oxygen is reduced at the cathode. An electrolyte contacts the electrodes, and may be alkaline or acidic. The phosphoric acid fuel cell (PAFC) is the type of fuel cell closest to commercialisation and there are a number of demonstration units, especially in Japan, where there are considerable economic and environmental pressures to reduce imports of hydrocarbon fuels and to cut polluting emissions from power generation. Many people consider that fuel cells are, however, unlikely to get beyond the demonstration stage unless there are overwhelming political or environmental reasons, because the power output is too low for the capital costs involved. In the PAFC, power output is limited in part by the activity of the cathode catalyst. Increasing cathode catalyst activity can result in higher power density at the same efficiency. The capital cost per unit of power is therefore reduced in proportion to the increase in performance. Because the cost of the cathode catalyst is only a fraction of the cost of the fuel cell stack, increasing the power density of the stack reduces the capital cost per unit power out of all proportion to the value of the catalyst per se. It is therefore widely recognised that a cathode catalyst with improved performance would have great value in reducing overall capital cost per unit power even in light of increased cost of the catalyst itself.

It has been proposed, e.g. in U.S. Pat. Nos. 3,354,060 and 3,468,717 (Standard Oil), U.S. Pat. No. 4,186,110 (United Technologies), GB 2,190,537A and 2,185,347A (Nippon Engelhard), to use alloys of platinum with base metals, deposited on a conductive carbon substrate, as electrode materials in acid electrolyte fuel cells. It is suggested in this prior art that such alloys, which include within their meaning solid solutions and intermetallic compounds, have greater activity per unit weight compared to unalloyed platinum. It is well known that increasing the effective surface area of the catalyst increases catalyst performance. There are several ways in which this may be achieved. Increasing the amount of supported catalyst in the electrode will increase the total effective surface area of active catalyst material. However, this increases the thickness of the fuel cell electrode, increasing internal resistance, thus reducing the overall benefit. Alternately, the weight percent of active metal supported on the carrier may be increased. This allows for an increase of the total amount of active catalyst material in the electrode without increasing the electrode thickness. However, the dispersion of the active metal must be retained at higher loading for this to be effective. It would therefore be very advantageous to make supported Pt alloy catalysts with higher metal loading than is currently practised with useful dispersion (active surface area per weight of metal), preferably at least equivalent to current practice.

It has become accepted in the fuel cell catalyst art that a "standard" catalyst formulation comprises approximately 7 to 11% by weight platinum, by itself or as an alloy, on carbon because of the difficulty in achieving useful dispersions of higher metal loading by normally available techniques. The prior art contains many statements concerning the desirability of high surface area, and there are some suggestions that catalysts may be made at weights of up to 20 or 30% by weight total metal on carbon. There are, however, no instances of such high loading Pt alloy catalysts being exemplified in a convincing manner.

In particular should be mentioned the techniques described by Stonehart et al in "Modern Aspects of Electrochemistry" Vol. 12, 183 et seq, and Stonehart states that it is possible to reach Pt loadings of 2 to 40 wt % in single component catalysts, using very high surface area carbon blacks (J. Electroanal. Chem., 261 (1989), p375). We are not aware that any alloy catalyst having a high activity and high loading has been described. High surface area carbons, however, corrode readily in hot concentrated phosphoric acid, and the integrity of an electrode made of such material is quickly lost. There remains a need for an electrode material having the high electrocatalytic activity of Pt alloys, with high metal loading, retaining high active metal dispersion and supported on a stable non-corroding carbon support which is capable of a relatively long effective life. It is an aim of the present invention to satisfy these criteria.

References herein to ECA (Electrochemical Area), are to areas determined in accordance with the method described in S. Gilman, J. Electroanal. Chem., 7, 1964, 382. This method is based on the use of cyclic voltammetry to deposit and strip off a monolayer coverage of hydrogen on the active catalyst surface at potentials close to hydrogen evolution. A three compartment electrochemical cell is used and hydrogen adsorption is measured on a fully wetted electrode comprising the electrocatalyst material. The charge associated with hydrogen adsorption is measured and using the relationship 1 $cm^2 Pt = 210$ uC (C-Coulomb), the electrochemical area of the catalyst in terms of $m^2/g$ Pt is determined.

Hereinafter, we shall use the terms "activity", "performance" and "stability" as defined below. Hydrophobic electrodes are prepared by mixing the catalyst with PTFE, applying to a wetproofed graphite paper and sintering as is usually practised in the art. Activity and performance are measured in a cathodic half cell using air and oxygen as reactants. The measurements are made at 180° C., atmospheric pressure and in 100% phosphoric acid as electrolyte. Activity is a measure of the oxygen reduction ability per unit weight of the platinum present, and is measured by the current flow through the electrode at an IR (Internal Resistance)-free potential of 900 mV, versus a Dynamic Hydrogen Electrode (DHE), with oxygen as the reactant, and is expressed in terms of milliamps per milligram of platinum present. In practice, PAFC cathodes operate using air as the oxidant gas, and at high current densities (greater than 100 mA/cm2). For electrode performance measurement we quote the IR-free electrode potential at 200 mA/cm2 with air as the oxidant.

During prolonged use under fuel cell operating conditions the active catalyst particles have a tendency to coalesce, either by surface migration or dissolution/reprecipitation. This process, known as sintering, causes a reduction in effective surface area and hence in activity. To provide an indication of the resistance of the catalyst to these detrimental sintering processes a "stability" test has been developed. A catalyst sample is thoroughly dispersed in 100% phosphoric acid, and is maintained at a temperature of 180° C. for 72 hours. An electrode is then prepared, and ECA, activity and performance measured as above and compared to the fresh catalyst.

The present invention provides a novel electrocatalytic material comprising an alloy of platinum, supported on a conductive carbon support, the platinum loading being in the range 20 to 60 wt % and the ECA of the alloy being greater than 35 m$^2$/g platinum. Preferably the BET surface area of the catalyst material is less than 1000 m$^2$/g, more preferably less than 300 m$^2$/g, and especially less than 120 m2/g, particularly if the material is for use in phosphoric acid fuel cell cathodes. Preferably the alloying element(s) are selected from the transition metals, more preferably from Groups IVB, VIB, VIIB, VIII, IB and IIIA of the Periodic Table in "Handbook of Chemistry and Physics", 64th Edition, CRC Press. Even more preferably, the alloying elements are selected from one or more of Ti, Cr, Mn, Fe, Co, Ni, Cu, Ga, Zr, and Hf, especially one or more of Cr, Mn, Co and Ni. Preferably, the atomic ratio of platinum to the alloying element(s) is in the range of 80:20 to 20:80, more preferably in the range of 65:35 to 35:65, especially approximately 50:50. These materials have an ECA greater than 35 m2/gPt, more preferably greater than 40 m2/gPt, especially greater than 45 m2/gPt. Preferred platinum loadings are in the range 20 to 45 wt %, more preferably 20 to 40 wt %, especially in the range 25 to 35 wt %. It is believed that this combination of properties has not previously been accessible by prior art techniques and that the material is novel.

The novel materials according to the invention demonstrate unexpectedly superior properties. In particular, with platinum loadings 2-4 times those which are conventionally used in the art, activity remains high throughout the range of loadings, and increased performance is found with increased platinum loading. Further, in the range of 25-35 wt % Pt, the increase in performance is greater than that predicted purely on the basis of increased platinum loading. This result is surprising and is not readily explained according to conventional thinking. Furthermore, we find the stability of these materials to be at least equivalent to that of conventional Pt alloy catalysts at 10 wt % Pt loading.

The invention further provides a method for the manufacture of a material as defined above, which method comprises a depositing from basic solution, compounds of the desired platinum group metal and desired alloying element(s) onto a conductive carbon electrocatalyst support to deposit a total amount of platinum of 20 to 60 wt % on the support, and reducing and heat treating the support carrying metal compounds to obtain an alloy of platinum and at least one other element, having an ECA in excess of 35 m$^2$/g of platinum.

Suitable conductive carbon supports are commercially available or may be prepared specifically for this application. Preferred carbons may be selected from the oil furnace carbon blacks or acetylene blacks. They may be used as prepared commercially, or specifically treated to increase their graphitic character.

In the method of the invention, it is preferred to dissolve the compounds of the metals in water and to add these sequentially to an aqueous basic slurry of the carbon, conveniently depositing the platinum group metal firstly. Desirably, the carbon is slurried in water and the slurry is rendered alkaline, for example by the addition of sodium bicarbonate which also serves as a buffer. Suitable metal compounds are, for example chloroplatinic acid for platinum, and readily soluble salts for the base metals, such as chlorides or nitrates. For the purpose of safety, care should be taken when adding chloroplatinic acid in particular, but also the other compounds, to avoid excessive gas evolution and eruption of the material from the vessel.

The deposited compounds are required to be reduced to the metal, so that they may form an alloy, and this may be accomplished in a number of ways. The reduction may be carried out in the liquid phase, by adding a reducing agent, such as hydrazine, formaldehyde or formic acid, to the slurry after deposition. In another reduction method, the slurry is dried and reduced using a gas phase reducing agent, which is suitably hydrogen, which may be diluted with an inert gas such as nitrogen. These particular reduction methods are followed by a heat treatment, for example to 600° to 1000° C. Another variant of the process permits reduction and heat treatment to take place in a single step; heating to a temperature of approximately 600° to 1000° C. under an inert gas or in a reducing atmosphere for an appropriate time of approximately one hour has been successful in tests. There are many methods of heating in order to form the alloy, and it is possible to alter the time and temperature profiles in order to achieve particular alloy characteristics. It is preferred to avoid temperatures significantly above 1000° C. if the material is heated for any significant time, since sintering and loss of surface area may occur. Care should be taken with carbon, carrying deposited platinum or compounds thereof, since it tends to be pyrophoric; it is preferably kept under an inert atmosphere or at least denied access to air or oxygen except when at approximately room temperature or below.

The materials of the invention have particular utility as the active component in the oxygen reduction electrode of an acid electrolyte fuel cell. Accordingly, the invention encompasses the use of the materials. The materials may be used in conventional manner, which generally involves dispersing the material in a suspension of PTFE, coating a substrate such as PTFE—wet proofed graphite paper with the dispersion, and sintering the coated substrate. The invention further includes a fuel cell, especially a phosphoric acid fuel cell, using an electrode according to the invention.

Although the material according to the invention has particular application in PAFC, and is described herein in detail with reference to this use, it is clear to us that the materials have uses in other fuel cells or for other applications.

The invention will now be particularly described in the following examples, which are to be regarded as illustrative and not limiting. Each of the exemplary catalysts was made into test electrodes following the methods outlined above. Measurements of ECA, activity and performance were taken to characterise the properties of the various catalysts. These results are presented in the Table.

EXAMPLE 1

Comparative Example—Pt/Co/Cr, 10 wt % Pt

A method following that described by Luczak and Landsman (U.S. Pat. No. 4,447,506) was used. A conventional high surface area 10.3 wt % Pt catalyst was prepared on Shawinigan carbon black. 48.6 g of this material was slurried in demineralised water. To the slurry was added 0.905 g of Co as $Co(NO_3)_2.6H_2O$ and 0.538 g of Cr as $Cr(NO_3)_3.9H_2O$. The slurry was vacuum dried at 80° C., then heat treated at 930° C. in a flowing nitrogen atmosphere for 60 minutes to form the alloy. The resulting catalyst comprised 10 wt % Pt, 1.8 wt % Co, and 1.08 wt % Cr with an atomic ratio of 50:30:20 Pt:Co:Cr.

EXAMPLE 2

Comparative Example—Pt/Ni, 10 wt % Pt

A Pt/Ni alloy catalyst was prepared at 10 wt % Pt loading as follows: 43.5 g Shawinigan acetylene black was added to 2,000 cm3 demineralised water and stirred for 15 minutes to produce a homogeneous slurry. 17.22 g sodium bicarbonate was added to the slurry and stirred for 5 minutes. The slurry was raised to 100° C. and maintained at the boil for 30 minutes. A solution of 5.0 g platinum as chloroplatinic acid, in 60 $cm^3$ demineralised water, was added to the slurry over 5 minutes. The slurry was boiled for 5 minutes. A solution of 1.51 g nickel, as the nitrate salt ($Ni(NO_3)_2.6H_2O$), in 50 $cm^3$ demineralised water was added over 10 minutes. The slurry was boiled for two hours. 3.9 cm3 of formaldehyde solution, diluted to 38 $cm^3$ was added over ten minutes. The slurry was boiled for a further 60 minutes and then filtered to remove the supernatent liquid and washed with demineralised water to remove the soluble chloride species. The chloride free filter cake was vacuum dried at 80° C. until the moisture content was less than 2%. The material was then heated to a temperature of 930° C. in a flowing nitrogen atmosphere and maintained at this temperature for 60 minutes to form the alloy. This gives a catalyst with a composition of 10 wt % Pt, 3.0 wt % Ni and a Pt:Ni atomic ratio of 50:50.

EXAMPLE 3

Comparative Example—Pt/Co/Cr, 20 wt % Pt

The conventional state of the art method, for preparing 10 wt % Pt alloy catalysts, as used in comparative Example 1, was employed in an attempt to prepare a Pt/Co/Cr catalyst at 20 wt % Pt loading. 37.12 g of Shawinigan acetylene black was added to 2,000 $cm^3$ demineralised water and stirred for 15 minutes to produce a homogeneous slurry. 36.11 g sodium bicarbonate was added to the slurry and stirred for 15 minutes. The slurry was brought to the boil and maintained at the boil for 30 minutes. 10.0 g platinum as chloroplatinic acid was diluted to 120 $cm^3$ in demineralised water and added to the slurry. The slurry was boiled for 90 minutes. 7.75 $cm^3$ of formaldehyde solution was diluted to 75 $cm^3$ and added to the slurry. The slurry was boiled for a further ten minutes and filtered to remove the supernatent liquid and washed with demineralised water to remove the soluble chloride species. The chloride free filter cake was vacuum dried at 100° C. until the moisture content was less than 2% to give the nominal 20 wt % Pt precursor catalyst material.

47.1 g of this material was slurried in demineralised water. To the slurry was added 1.81 g of Co as $Co(NO_3)_2.6H_2O$ and 1.08 g of Cr as $Cr(NO_3)_3.9H_2O$. The slurry was vacuum dried at 80° C., then heat treated at 930° C. in a flowing nitrogen atmosphere for 60 minutes to form the alloy. The resulting catalyst comprised 20 wt % Pt, 3.6 wt % Co, and 2.1 wt % Cr with an atomic ratio of 50:30:20 Pt:Co:Cr.

EXAMPLE 4

Comparative Example—Pt/Ni, 20 wt %

The method as described in comparative Example 3 was used in an attempt to prepare a Pt/Ni catalyst at 20 wt % Pt loading. The alloying metal addition comprised 3.01 g Ni as $Ni(NO_3)_2.6H_2O$. The resulting catalyst comprised 20 wt % Pt and 6 wt % Ni with an atomic ratio of 50:50 Pt:Ni.

EXAMPLE 5

Example—Pt/Ni, 20 wt % Pt

A Pt/Ni alloy catalyst was prepared at 20 wt % Pt loading as follows: 37.0 g Shawinigan acetylene black was added to 2,000 $cm^3$ demineralised water and stirred for 15 minutes to produce a homogeneous slurry. 34.45 g sodium bicarbonate was added to the slurry and stirred for 5 minutes. The slurry was raised to 100° C. and maintained at the boil for 30 minutes. A solution of 10.0 g platinum as chloroplatinic acid, in 100 cm3 demineralised water, was added to the slurry over 5 minutes. The slurry was boiled for 5 minutes. A solution of 3.01 g nickel, as the nitrate salt ($Ni(NO_3)_2.6H_2O$), in 75 $cm^3$ demineralised water was added over 10 minutes. The slurry was boiled for two hours. 7.8 $cm^3$ of formaldehyde solution, diluted to 75 $cm^3$ was added over ten minutes. The slurry was boiled for a further 60 minutes and then filtered to remove the supernatent liquid and washed with demineralised water to remove the soluble chloride species. The chloride free filter cake was vacuum dried at 80° C. until the moisture content was less than 2%. The material was then heated to a temperature of 930° C. in a flowing nitrogen atmosphere and maintained at this temperature for 60 minutes to form the alloy. This gives a catalyst with a composition of 20 wt % Pt, 6.0 wt % Ni and a Pt:Ni atomic ratio of 50:50.

EXAMPLE 6

Example—Pt/Co/Cr, 20 wt % Pt

The method as described in Example 5, was used to prepare a Pt/Co/Cr catalyst at 20 wt % Pt loading. The base metal solution comprised 1.81 g Co as $Co(NO_3)_2.6H_2O$ and 1.07 g Cr as $Cr(NO_3)_3.9H_2O$ in 150 cm3 demineralised water. This gives a catalyst with a composition of 20 wt % Pt, 3.6 wt % Co, and 2.1 wt % Cr and an atomic ratio of Pt:Co:Cr of 50:30:20.

EXAMPLE 7

Example—Pt/Mn, 25 wt % Pt

The method as described in Example 5 was used to prepare a Pt/Mn catalyst at 25 wt % Pt loading. The base metal solution comprised 5.63 g of Mn as $MnCl_2.4H_2O$ dissolved in 250 ml demineralised water. The quantity of Pt used was 20 g Pt as CPA, and that of carbon was 54.5 g to give a catalyst with composition of 25 wt % Pt and 7 wt % Mn with an atomic ration of 50:50 Pt:Mn. In addition, no formaldehyde was added during the catalyst preparation.

EXAMPLE 8

Example—Pt/Ni, 25 wt % Pt

The method as described in Example 5 was used to prepare a Pt/Ni catalyst at 25 wt % Pt loading, except that all reagent quantities were altered in proportion to give a catalyst with a composition of 25 wt % Pt and 7.5 wt % Ni.

EXAMPLE 9

Example—Pt/Ni, 25 wt % Pt

The method as described in Example 8 was used to prepare a Pt/Ni catalyst at 25 wt % Pt loading, except that the carbon support was Cabot Vulcan XC72R furnace black and no formaldehyde solution was added during the catalyst preparation.

EXAMPLE 10

Example—Pt/Ni, 30 wt % Pt

The method as described in Example 8 was used to prepare a Pt/Ni catalyst at 30 wt % Pt loading, except that no formaldehyde solution was added during the catalyst preparation. The catalyst composition was 30 wt % Pt and 9.0 wt % Ni.

EXAMPLE 11

Example—Pt/Ni, 35 wt % Pt

The method as described in Example 8 was used to prepare a Pt/Ni catalyst at 35 wt % Pt loading, except that no formaldehyde solution was added during the catalyst preparation. The catalyst composition was 35 wt % Pt and 10.5 wt % Ni.

EXAMPLE 12

Example—Pt/Ni, 40 wt % Pt

The method as described in Example 8 was used to prepare a Pt/Ni catalyst at 40 wt % Pt loading, except that the carbon support was Cabot Vulcan XC72R furnace black and no formaldehyde solution was added during the catalyst preparation. The catalyst composition was 40 wt % Pt and 12.0 wt % Ni.

EXAMPLE 13

The catalyst of Example 1 after the stability test.

EXAMPLE 14

The catalyst of Example 2 after the stability test.

EXAMPLE 15

The catalyst of Example 5 after the stability test.

EXAMPLE 16

The catalyst of Example 9 after the stability test.

crease in ECA and hence activity and performance, with the increase in Pt loading from 10 wt % (Examples 1 and 2) to 20 wt %. Specifically, the ECA is reduced by approximately half. The activity suffers a similar reduction, as would be predicted from the ECA data, and the performance shows essentially no improvement with the doubling of Pt loading. In contrast, while the catalytic materials of the invention do show a variation of ECA as metal loadings increase, these are significantly less dramatic, and do not fall below the 35 m$^2$/g limit. With the ECA values of the materials of the invention essentially equivalent to those of the conventional 10 wt % Pt materials, the activities are found to be essentially equivalent as well, as would be predicted from the ECA data. As a result, the air performances of the Examples according to the invention are significantly better than the prior art Examples. This desirable but previously unattainable result is clearly advantageous and readily explained on the basis of maintaining ECA with increased Pt content. In addition, the improvements demonstrate an unexpected superiority in the range of 25 to 35 wt % Pt. The extent of the improvement will be more readily realised when it is considered that an improvement of 27 mV (assuming a 90 mV/decade Tafel slope for the 4 electron oxygen reduction reaction) in the measured parameter is equivalent to a doubling in power output from a fuel cell. This translates into the possibility of doubling the power output for a given size of fuel cell stack, or halving the size of the stack for the same output. Thus in the case of Example 8, having a 25% Pt loading and an air performance of 797 mV, compared to Example 2 with a 10% Pt loading and an air performance of 747 mV, the 50 mV difference is equivalent to a power increase factor of approximately 4, significantly better than the projected increase of a factor of 2.5 based purely on the increase in the Pt loading. This is completely unexpected, and we do not yet have an adequate explanation. However, this result is supported by the air performances for the other Examples according to the invention.

From consideration of Examples 13 through 16 it is clear that the stabilities of the Examples according to the invention (Examples 15 and 16) as assessed by the change in ECA, activity, and performance after the sintering treatment, are surprisingly superior to the Examples of the conventional art (Examples 13 and 14). This is a surprising result in light of the conventional

TABLE

| EXAMPLE NO. | FORMULATION | PT LOAD WT % | ECA (m$^2$/g Pt) | ACTIVITY (mA/mg Pt) | PERFORMANCE (mV at 200 mAcm2) |
|---|---|---|---|---|---|
| 1 | Pt/Co/Cr | 10 | 41 | 36 | 719 |
| 2 | Pt/Ni | 10 | 63 | 50 | 747 |
| 3 | Pt/Co/Cr | 20 | 19 | 19 | 716 |
| 4 | Pt/Ni | 20 | 34 | 22 | 728 |
| 5 | Pt/Ni | 20 | 49 | 44 | 765 |
| 6 | Pt/Co/Cr | 20 | 45 | 47 | 758 |
| 7 | Pt/Mn | 25 | 69 | 55 | 781 |
| 8 | Pt/Ni | 25 | 50 | 59 | 797 |
| 9 | Pt/Ni | 25 | 67 | 64 | 788 |
| 10 | Pt/Ni | 30 | 51 | 63 | 802 |
| 11 | Pt/Ni | 35 | 43 | 54 | 798 |
| 12 | Pt/Ni | 40 | 38 | 40 | 784 |
| 13 | Pt/Co/Cr | 10 | 29 | 30 | 711 |
| 14 | Pt/Ni | 10 | 57 | 40 | 729 |
| 15 | Pt/Ni | 20 | 47 | 38 | 768 |
| 16 | Pt/Ni | 25 | 64 | 53 | 791 |

It can readily be seen that the prior art catalysts as exemplified in Examples 3 and 4 show the typical dewisdom that high loading samples will have reduced stability.

We claim:

1. An electrocatalytic material comprising an alloy of platinum supported on a conductive carbon support, the platinum loading being in the range of 20 to 60 wt %, and the ECA of the alloy being greater than 35 $m^2/g$ Pt.

2. A material as claimed in claim 1, in which the alloying element is one or more selected from Groups IVB, VIB, VIIB, VIII, IB, and IIIA.

3. A material as claimed in claim 2, in which the alloying element is one or more of Ti, Cr, Mn, Fe, Co, Ni, Cu, Ga, Zr and Hf.

4. A material as claimed in claim 3, in which the alloying element is one or more of Cr, Mn, Co and Ni.

5. A material as claimed in claim 1, in which the BET surface area of the catalyst is less than 1,000 $m^2/g$.

6. A material as claimed in claim 5, in which the BET surface area of the catalyst is less than 300 $m^2/g$.

7. A material as claimed in claim 6, in which the BET surface area of the catalyst is less than 120 $m^2/g$.

8. A material as claimed in claim 1, in which the atomic ratio of Pt to the alloying element(s) is in the range of 80:20 to 20:80.

9. A material as claimed in claim 8, in which the atomic ratio of Pt to the alloying element(s) is in the range of 65:35 to 35:65.

10. A material as claimed in claim 9, in which the atomic ratio of Pt to the alloying element(s) is approximately 50:50.

11. A material as claimed in claim 1, in which the loading of platinum metal is in the range 20 to 45 wt %.

12. A material as claimed in claim 11, in which the loading of platinum metal is in the range 20 to 40 wt %.

13. A material as claimed in claim 12, in which the loading of platinum metal is in the range of 25 to 35 wt %.

14. A material as claimed in claim 1, in which the ECA of the alloy is greater than 40 $m^2/g$ Pt.

15. A material as claimed in claim 14, in which the ECA of the alloy is greater than 45 $m^2/g$ Pt.

16. A method for the production of an electrocatalytic material as claimed in claim 1, comprising depositing from basic solution compounds of platinum and one or more alloying elements, onto a conductive carbon electrocatalyst support to deposit a total amount of platinum of 20 to 60 wt % on the support, and reducing and heat treating the support carrying the compounds to obtain an alloy of platinum and at least one other element, of ECA in excess of 35 $m^2/g$ of platinum.

17. A method as claimed in claim 16, wherein the compounds are dissolved in water, and are added to an aqueous basic slurry of the carbon.

18. A catalysed electrode comprising an electrocatalytic material as claimed in claim 1.

19. A fuel cell comprising a catalysed electrode as claimed in claim 18.

20. A fuel cell as claimed in claim 19, wherein the said catalysed electrode is the cathode and the electrolyte is phosphoric acid.

21. The method of claim 16, wherein platinum is first deposited onto said support, then said alloying element is deposited.

22. The method of claim 16, wherein platinum is deposited onto said support after said alloying element is deposited thereon.

* * * * *